Nov. 15, 1949     E. F. GOEBEL     2,488,009
FUEL OIL FILTER
Filed March 1, 1948
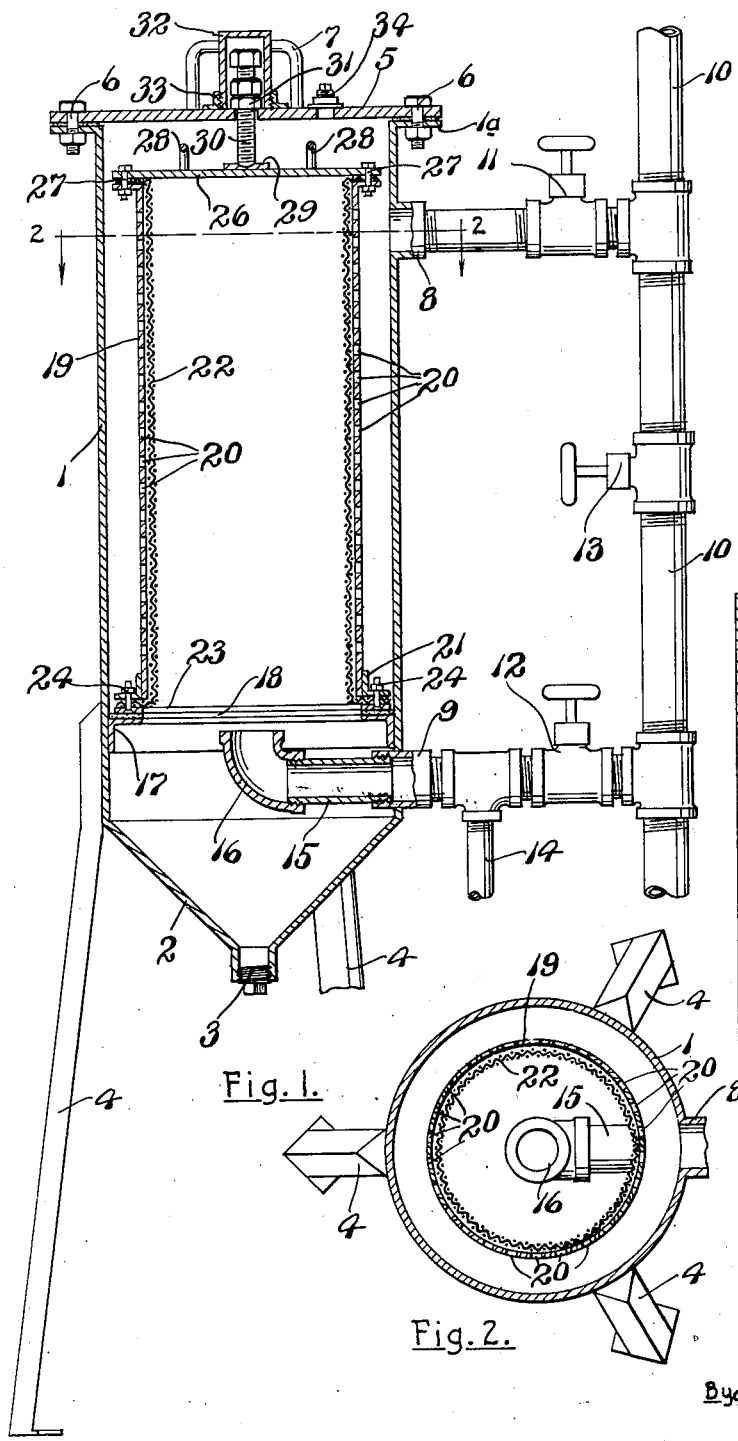
Fig. 1.
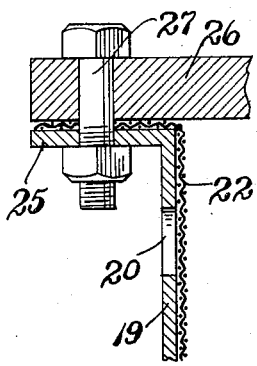
Fig. 3.
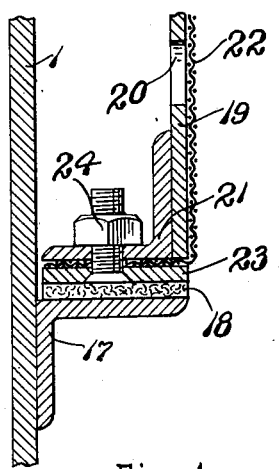
Fig. 4.
Fig. 2.
Inventor
Edward F. Goebel
By Liverance and
Van Antwerp
Attorneys Patented Nov. 15, 1949

2,488,009

UNITED STATES PATENT OFFICE 2,488,009

FUEL OIL FILTER

Edward F. Goebel, Grand Rapids, Mich.

Application March 1, 1948, Serial No. 12,279

1 Claim. (Cl. 210—187)

This invention relates to and is concerned with a novel and very effective oil filter.

The fuel oil which is pumped under pressure to burners of oil, and also a similar character of oil which is forced into the cylinders of Diesel engines as the fuel for driving an engine, carries in it a small amount of very fine sand, water, and at times a small amount of organic matter which may, and frequently does, deposit in a substantially gum-like form in the orifices of the fuel injection nozzle of a Diesel engine, or in the fuel carrying passages through which the fuel is carried to burners, with a closing or a reduction in area passage of said injection nozzles or burners. The sand in a very finely divided form and substantially as impalpable dust, has an abrasive action which cuts the metal around and at the outlets of said fuel injection nozzles in Diesel engines and the burners, so that in a relatively short time such burners or nozzles must be either repaired or replaced. Water in the oil is also detrimental in use. In the meantime the burning of the fuel at the burners is rendered imperfect, particularly in the directions in which the flame is projected from the burners and the control of fuel injected into a Diesel engine cylinder is affected as to quantity and otherwise.

The present invention is directed to a very efficient and practical filter for removing such undesired ingredients present in and carried with the fuel or engine oil. It is a primary object and purpose of the present invention to provide a filter which acts effectively and substantially perfectly for the removal of the undesired dirt, water, and the like in the burner fuel or engine fuel oil, which is readily manufactured economically, in which the filter may be very easily removed for replacement or repair or cleaning when needed, and in which the immediate filter member may be thoroughly cleaned without such removal.

The structure which I have produced and which has proven very practical and effective, as an embodiment of my invention, is shown in the accompanying drawing, in which, Fig. 1 is a partial vertical section and side elevation of the complete filter structure made in accordance with my invention, Fig. 2 is a horizontal section through the filter drum and the filter basket structure, substantially on the plane of line 2—2 of Fig. 1, looking downwardly as indicated by the arrows, Fig. 3 is a fragmentary enlarged vertical section through the upper end portion of the filter basket housed within the drum, and Fig. 4 is a similar enlarged fragmentary vertical section at the lower end and through one side of the filter basket and adjacent portions of the drum in which it is housed.

Like reference characters refer to like parts in the different figures of the drawing.

In the construction shown a vertical cylindrical drum or housing 1 of metal of a suitable gauge is open at its upper end and has formed at such upper end an outwardly extending horizontal annular flange 1a. At its lower end a funnel-like or conical closure 2 therefor of substantially the same gauge of metal is either integrally formed therewith or permanently welded thereto. It has an outlet opening at its lower point closed as shown by a closure plug 3, or if desired, any suitable equivalent opening and closing valve may be used for opening for or closing against the escape of any materials from within the drum. This drum is in practice supported at the upper ends of generally vertical but somewhat downwardly diverging spaced legs 4 which at their lower ends reach to and may be secured to a floor. The open upper end of the drum is closed by a heavy horizontal closure plate 5 bolted by means of a series of spaced bolts 6 to the annular flange 1a, there being a sealing gasket between the upper side of the flange and the closure plate 5 as shown. The plate 5 may be equipped with upwardly extending inverted U-shaped handles 7 for ready handling thereof.

Near the upper end of the drum 1, but a short distance below its upper end, a laterally disposed outlet 8 is shown and adjacent the lower end of the drum, but above the funnel-like closure 2, an inlet sleeve coupling 9 is secured and welded in place. In practice more than one of the upper inlet members 8 may be located around the drum, all of those not in use being tightly closed. The inlet and outlet to the drum are connected with a fuel oil feed pipe 10 by suitable short lengths of pipe, nipples and couplings, the detail of which need not be outlined at length but which are fully shown in Fig. 1. In the drum outlet conduit, a manually operable valve 11 is located which may be opened for free passage or closed to obstruct and stop any oil passage. Similarly, a lower valve 12 of the same type is in the inlet line between the oil carrying line 10 and the drum. In the length of the oil conduit 10 between the inlet and outlet to the drum 1, a third valve 13 adapted to be manually opened and closed is located. In the lower inlet branch conduit from the fuel conduit 10 to the lower end of the drum, a steam carrying pipe 14 is located which will be provided with a valve for opening and closing the pipe for the passage or non-passage of steam.

At the inner end of the sleeve coupling 9, a short pipe 15 extends radially inward and at its inner end, an elbow fitting 16 is attached, having an outlet at its end so that oil passing therefrom is projected upwardly substantially in line with the central vertical axis of the cylinder drum 1.

A filter basket is located within the drum. Its lower end is open and slightly above the open upper end of outlet 16. Around and at the inner side of the drum 1 an annular ring 17 of angle iron is located, having a vertical flange or leg lying against the inner side of the drum 1 and welded permanently thereto. Its horizontal flange extends inwardly from the walls of the drum 1. At the upper side of the horizontal flange of the ring 17 a gasket 18 is located and rests thereon.

The filter basket includes an outer cylindrical shell 19 of sheet metal of a suitable gauge, which has through it substantially over its entire surface, except a short section at its lower end, small holes 20 spaced short distances from each other. At the outer side and lower end portion of the shell 19 a ring 21 of angle iron has its vertical leg against and welded to the shell 19 and its horizontal leg extends outwardly. The diameter of the shell 19 is such that its inner surface is substantially a continuation of the inner edge surface of the horizontal leg of the ring 17. Thus the horizontal leg of the ring 21 is located above the horizontal leg of the ring 17, as best shown in Fig. 4.

The shell 19 is lined throughout its inner surface with a fine mesh screen 22. Said screen at its lower end is turned to extend outwardly under the horizontal outwardly extending leg of the ring 21 and is securely clamped to said ring by means of a ring 23 of flat metal underneath the turned-out lower end of the screen, bolts 24 with countersunk heads extending upwardly through the flat ring 23, through the screen and through the outwardly extending horizontal leg of the ring 21. When the filter basket is in place the flat ring 23 rests against the upper side of the gasket 18.

The upper end of the shell 19 is formed with an outwardly extending continuous annular flange 25 around it. A circular closure plate 26 for the upper end of the shell extends over the flange 25 and the upper end of the screen 22 is turned to extend outwardly between the plate 26 and the upper side of the flange 25 and is firmly and securely clamped in place by bolts 27 as best shown in Fig. 3. The filter basket upper closure plate 26 may be provided with handles 28 for easy handling of the basket. It is evident that there is an annular space between the walls 1 of the drum 1 and the shell 19 of the filter basket, and that oil under pressure entering the filter basket from the member 16, being directed and forced upwardly, goes into the filter basket and before passing out at the outlet at 8, must pass through the screen and the openings 20 in the shell 19.

At the central portion and upper side of the plate 26 a small socket plate 29 is welded having a depression in its upper side for reception of the lower end of a vertical screw 30, the threaded shank of which extends upwardly through an opening in the plate 5 and through a nut 31 welded securely to the plate 5. Above the nut 31 a locking nut of conventional use is on the screw. The upper end and head of the screw and the locking nut and the nut 31 are covered by a closure cap 32 which is detachably screwed into an interiorly threaded collar 33 permanently fastened at the upper side of the plate 5. Said plate 5 is also provided with a vent opening which may be closed by a closure plug 34.

The oil which is to be filtered, being pumped under pressure, is forced through the pipe 15 and at its outlet 16 is directed upwardly into the lower end of the filter basket. It leaves at the outlet at 8 and continues in the oil line conduit 10 to the burner or engine which is to be served. The valve at 13 is closed and the valves at 11 and 12 are open. The pressure of the screw 30 at the upper end of the filter basket holds it at its lower end in firm contact with the gasket 18 and the oil must pass through the screen 22 and the openings 20 in the shell 19.

The screen is of a fine mesh. For oil burner service in practice, a sixty mesh screen may be used. For screening fuel to a Diesel engine a still finer screen is preferably used, or one of one hundred mesh. Of course the screen should be of a fineness such that no water in the oil nor any of the very finely divided impalpable sand particles will pass. The openings at 20 are small openings closely placed together and in general, though not necessarily, approximately ¼" in diameter. For purposes of disclosure both the screen mesh and the openings are exaggerated in the drawing.

This construction of filter has been built and installed in numbers and operates with complete satisfaction. The screened-out water and sand or other dirt settles to the bottom of the funnel-like lower end 2 of the enclosing drum, and the settlings may be drawn off from time to time, whenever needed, by removing the plug 3 or, should a valve be used, by moving it to open position. Such settlings will be forced out by the oil pressure.

By proper operation of the valves 11, 12 and 13 the filter may be cut out of the oil line by opening the valve 13 and closing the valves 11 and 12. It is evident that the filter basket may be readily removed by removing the plate 5 and then lifting it by its handles 28. It may be repaired by substitution of a new screen member 22 whenever needed, or the screen and the shell can be more thoroughly cleaned by removing the basket entirely from within the drum. At times, however, with a closure of the valves 11 and 12 and an opening of the valve 13, during any time that the pump which is forcing the oil is operating, the closing off of the filter by such valve operation may be followed by opening of the valve which controls the passage of live steam into and through the pipe 14 and flowing thence therefrom upwardly into the filter basket and cleaning said basket through the effects of live steam thereon. The outlet at the lower end of the funnel bottom 2 is open under such circumstances and dirt and the like passes by gravity therethrough.

The structure described is very practical and useful and has resulted in a marked improvement in the fuel oil passed to burners in oil burning furnaces and in the fuel oil which is used with Diesel engines. Of course the filter is of utility and value in connection with any oil for filtering the same to remove water, fine sand and other undesirable materials therein. The fuel from the burner is better and the burner passages are not abraded by sand as heretofore. Also the fuel injection nozzles of Diesel engines are not worn out of shape and enlarged, not only resulting in greater life for said injection nozzles, but providing a more accurate and perfect control of the fuel charge to the engine cylinders.

The invention is defined in the appended claim and is to be considered comprehensive of all forms of structure coming within their scope.

I claim:

In a filter structure, a vertical hollow housing closed at its upper end and having a closed lower end with an outlet therein, means for opening or closing said outlet, an inverted filter basket positioned vertically within said housing having an open lower end, a closed upper end and vertical walls comprising, a shell having a plurality of small spaced openings therethrough lined by a fine mesh screen, means for securing said screen at the upper and lower ends of said shell, the walls of said shell and the top of said filter basket being spaced from the walls of the housing and the top thereof, an annular supporting shelf at the inner side of said housing upon which the lower end of said filter basket rests, means adjustably extending through the top of the housing and engaging with the top of the filter basket for pressing the lower end of the filter basket against said shelf, an outlet conduit at a side of the housing and near its upper end, an inlet conduit extending through a side of said housing a distance above the outlet opening in said housing bottom and below the open lower end of said screen basket, for carrying oil to be filtered, said inlet conduit at the inner end thereof having an up-turned terminal portion for directing oil passing therethrough upwardly into said filter basket at the open lower end thereof, said annular support for the lower end of the filter basket comprising, a ring of angle iron form having a vertical leg permanently secured to and at the inner side of the walls of said housing, and an inwardly extending horizontal leg, a gasket over said horizontal leg, and the shell of said filter basket at the lower end thereof having a ring of angle iron cross section around it having a vertical leg permanently secured to the shell and an outwardly extending horizontal leg lying over the horizontal leg of the first mentioned ring, and a ring of flat metal underneath the horizontal flange of the ring attached to said shell bolted thereto, the lower end portion of said screen extending outwardly between the upper side of said flat ring and the lower side of the horizontal flange of said second mentioned ring, said flat ring bearing against the gasket.

EDWARD F. GOEBEL.

REFERENCES CITED

The following references are of record in the file of this patent:

UNITED STATES PATENTS

| Number | Name | Date |
| --- | --- | --- |
| 908,308 | Mueller | Dec. 29, 1908 |
| 1,035,248 | Seavey | Aug. 13, 1912 |
| 1,677,118 | Ford | July 10, 1928 |
| 2,197,471 | Hooper | Apr. 16, 1940 |
| 2,207,346 | Hooper | July 9, 1940 |
| 2,244,574 | Rogers | June 3, 1941 |
| 2,358,509 | Hinsch et al. | Sept. 19, 1944 |
| 2,374,613 | Muller | Apr. 24, 1945 |

FOREIGN PATENTS

| Number | Country | Date |
| --- | --- | --- |
| 8,184 | Great Britain | 1892 |